3,463,739
METHOD FOR RECOVERING POLONIUM-210 FROM BISMUTH

Wallace W. Schulz and Gary F. Schiefelbein, Richland, and Lester E. Bruns, Kennewick, Wash., assignors to the United States of America as represented by the United States Atomic Energy Commission
No Drawing. Filed June 4, 1968, Ser. No. 734,198
Int. Cl. C01g 57/00; C07f 11/00
U.S. Cl. 252—301.1                          4 Claims

ABSTRACT OF THE DISCLOSURE

A method for recovering polonium-210 from bismuth using both pyrochemical and liquid-liquid solvent extraction steps. Molten bismuth containing the polonium is contacted at 400–500° C. in an inert atmosphere with sodium hydroxide. The polonium is then recovered from the sodium hydroxide melt by liquid-liquid solvent extraction.

CONTRACTUAL ORIGIN OF THE INVENTION

The invention described herein was made in the course of, or under, a contract with the United States Atomic Energy Commission.

BACKGROUND OF THE INVENTION

This invention relates to a method for recovering polonium from irradiated bismuth. In more detail, the invention relates to a combined pyrochemical-liquid-liquid solvent extraction process for recovery of polonium-210.

Neutron irradiation of bismuth produces polonium-210 according to the reaction

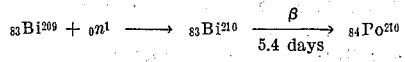

$$_{83}Bi^{209} + {}_0n^1 \longrightarrow {}_{83}Bi^{210} \xrightarrow[5.4 \text{ days}]{\beta} {}_{84}Po^{210}$$

Polonium-210 has a half-life of about 138 days and decays by alpha emission to stable lead-206. Because of its short half-life and high specific activity, polonium-210 is a valuable isotopic power source.

Various processes have been proposed and tested for recovery and separation of polonium-210 from irradiated bismuth metal. In most, the bismuth is dissolved in acidic media and polonium-210 is subsequently recovered and purifield by precipitation, adsorption, or liquid-liquid solvent extraction schemes. For production and recovery of kilogram amounts of polonium-210 these processes have the disadvantage that extensive and expensive operations are required for conversion of the bismuth to the metal for further irradiation. These objectionable bismuth reconversion steps are avoided in a vacuum distallation process in which polonium-210 is volatilized from molten bismuth metal at temperatures in the range 700–900° C. Creation and maintenance of the required vacuum on an engineering scale is difficult and expensive, however. Also, safe handling of large amounts of extremely toxic polonium vapor produced in the volatilization process is a highly formidable task. The high corrosivity of molten bismuth at 700–900° C. is yet another deterrent to the volatilization process; expensive materials of construction are required to contain bismuth metal satisfactorily at these temperatures.

It is accordingly an object of the present invention to provide a new process for the recovery of polonium from irradiated bismuth metal.

It is another object of the present invention to provide a new process for the recovery of polonium from bismuth wherein the bismuth is retained in the metallic state throughout the process.

It is still another object of the present invention to provide such a process employing lower temperatures than those heretofore suggested.

SUMMARY OF THE INVENTION

These and other objects of the present invention are attained by contacting irradiated molten bismuth metal with sodium hydroxide at 400 to 500° C. in an inert atmosphere. The phases are separated while still molten and the sodium hydroxide phase dissolved in nitric acid. Polonium is then extracted from the nitric acid solution using a radiation stable organic extractant such as dibutylbutyl phosphonate (DBBP).

DESCRIPTION OF THE PREFERRED EMBODIMENT

Experimental evidence which demonstrates the versatility and usefulness of the combined pyrochemical-solvent extraction process according to the present invention will be given next.

Two to eight gram quantities of irradiated bismuth containing from 3 to 90 m Ci of polonium-210 per gram were agitated 30 to 60 minutes at 400 to 600° C. in an inert atmosphere (nitrogen or argon) with about one-tenth to four times their weight of sodium hydroxide. The bismuth and sodium hydroxide were contained in a graphite or stainless steel boat; the boats themselves were placed in a Vycor tube with provision for flushing with the desired gas. Heating and agitation of the bismuth and sodium hydroxide was accomplished in a tube furnace designed to move in a horizontal plane through a 2-inch amplitude stroke at 48 strokes per minute. Except in one or two cases, reagent-grade sodium hydroxide was used. In each experiment the sodium hydroxide was heated to 340° C. for a few minutes to remove associated water. Subsequently, the bismuth metal was added and the mixture heated to the desired temperature while continuously flushing the entire system with the inert gas. The fusion was completed by rocking the system for the specified time at the specified temperature.

To determine the distribution of polonium-210, the cooled, fused mass from each experiment was treated with 100 to 200 ml. of warm 1–2 M hydroxyacetic acid solution. This solution dissolved the sodium hydroxide without affecting the bismuth metal. The latter was dissolved separately in nitric acid. It should be emphasized that this procedure was used for convenience only, as in plant-scale applications the phases would be separated while still molten, and the sodium hydroxide dissolved in aqueous nitric acid for subsequent solvent extraction of the polonium-210.

The following table gives the results of these experiments.

| Exp. No. | Wt. Bi, gms. | Wt. ratio NaOH/Bi | Fusion conditions | | | Po$^{210}$ distribution, percent | |
|---|---|---|---|---|---|---|---|
| | | | Time, min. | Temp., °C. | Atmosphere | In Bi[1] | In NaOH[1] |
| 1[2] | 2.10 | 1.0 | 45 | 400 | Argon | 4.0 | 98.0 |
| 2[2] | 2.14 | 3.0 | 45 | 400 | do | 0.51 | 101.3 |
| 3[2] | 2.16 | 1.0 | 45 | 600 | do | 0.55 | 100.7 |
| 4[2] | 2.04 | 3.0 | 45 | 600 | do | 2.03 | 94.4 |
| 5[2] | 2.66 | 4.0 | 30 | 500 | do | 0.29 | 97.3 |
| 6[2] | 2.09 | 3.0 | 30 | 500 | do | 0.27 | 97.3 |
| 7[3] | 2.00 | 2.0 | 45 | 500 | do | 0.43 | 93.4 |
| 8[2] | 1.99 | 1.0 | 60 | 500 | do | 0.57 | 98.6 |
| 9[4] | 3.52 | 0.74 | 60 | 500 | Nitrogen | 0.60 | 97.1 |
| 10[4] | 6.89 | 0.48 | 60 | 500 | Argon | 0.90 | 93.7 |
| 11[4] | 7.39 | 0.29 | 60 | 500 | Nitrogen | 2.0 | 93.6 |
| 12[4] | 7.24 | 0.12 | 60 | 500 | do | 3.6 | 93.0 |
| 13[4] | 8.13 | [5] 0.24 | 60 | 500 | Argon | 3.1 | 91.2 |
| 14[4] | 4.26 | [6] 0.46 | 60 | 500 | Nitrogen | 1.9 | 89.9 |
| 15[4] | 5.50 | 0.89 | 60 | 500 | Air | 64.7 | 41.8 |

[1] By analysis.
[2] Initial bismuth contained 3 to 6 m Ci Po$^{210}$/gram.
[3] Initial bismuth contained 90 m Ci Po$^{210}$/gram.
[4] Initial bismuth contained 36 to 55 m Ci Po$^{210}$/gram.
[5] Technical-grade NaOH.
[6] Reagent-grade NaOH containing added 2% Na$_2$CO$_3$.

It is clear from this table that a single contact of the molten bismuth with sodium hydroxide transfers over 98% of the polonium to the sodium hydroxide phase over a wide range of times and temperatures. Polonium transfer is not sensibly affected by the purity of the sodium hydroxide being equally high with technical and reagent-grade materials. Satisfactory transfer of the polonium to the sodium hydroxide phase does not take place in air. However, transfer may be carried out in an inert gas such as nitrogen, argon or helium rather than in a vacuum, as was believed necessary prior to this invention.

It will be appreciated that solvents other than DBBP can be used, although this material is the best known to us at present. For example, dibutyl Carbitol can also be used, although this material is not as stable as radiation as is DBBP.

Gamma energy analyses performed on solutions of both the bismuth and sodium hydroxide phases obtained in Experiment 7 showed that 99+% of the antimony-124 and zinc-65 present in the bismuth transferred to the sodium hydroxide phase. It has recently been shown that it is desirable to maintain very low concentrations of antimony-124, zinc-65 and silver and tantalum in bismuth recycled to a reactor to avoid accumulation of neutron activation products which complicate handling the bismuth metal. The procedure described herein incidentally removes antimony and zinc from the bismuth and probably, on the basis of known chemistry, also the tantalum.

The feasibility of using liquid-liquid solvent extraction techniques to recover and purify polonium-210 from a nitric acid solution of the sodium hydroxide melt was demonstrated in the following experiment. The sodium hydroxide melt from Experiment No. 1 in the table was dissolved in 40 ml. of water. The resulting solution was adjusted to about 2.0 M HNO$_3$ and then boiled and concentrated to prepare a solution of the composition 4.0 M NaNO$_3$-3.1 M HNO$_3$-0.1 Ci/l. polonium-210. From this concentrate a feed solution of the composition 2.5 M NaNO$_3$-2.9 M HNO$_3$-0.06 Ci/l. polonium-210 was prepared. Finally, a portion of this final feed solution was contacted (10 min. at 25° C.) with an 0.8 volume portion of 30 vol. percent DBBP in kerosene. The equilibrium aqueous phase acidity was 2.24 M HNO$_3$ while the polonium-210 distribution ratio was 1.16. This latter value is in reasonable agreement with that expected and is sufficiently high to permit successful application of countercurrent solvent extraction techniques to recovery of polonium.

This new polonium-210 recovery process is simple and highly efficient and has significant advantages over other polonium recovery processes. Foremost of these, of course, is that it, like the vacuum distillation process, keeps the bismuth as the metal. Unlike the distillation process, however, only a simple inert atmosphere is required for satisfactory operation of the pyrochemical steps; elimination of the need to create and maintain a high vacuum represents a major cost savings. Elimination of the vacuum feature also makes the pyrochemical step much easier to operate on a large scale than the distillation process; thus, depending on desired recoveries and decontamination features, the pyrochemical process can be operated on a multiple as well as on a single batch basis and even under countercurrent conditions. Further, the pyrochemical process is operable over a wide range of temperatures and bismuth-to-sodium hydroxide ratios and can be performed satisfactorily in conventional stainless steel equipment. It removes (in addition to the polonium-210) from the bismuth phase certain other impurity isotopes (e.g., zinc-65) which when neutron activated complicate handling of the recycled bismuth metal. This latter decontamination potential is a further advantage of the new process over vacuum distillation.

The benefits of the pyrochemical step are enhanced when it is combined with a liquid-liquid solvent extraction process for final purification of the polonium. Prior pyrochemical separation of the bismuth greatly simplifies solvent extraction of the polonium-210 and makes the solvent extraction operation a direct and efficient way to prepare a purified polonium concentrate suitable for conversion to metal by established techniques. In particular, prior removal of the bismuth permits the use of a more radiation stable organophosphorus extractant such as DBBP rather than one like dibutyl Carbitol required when the polonium is associated with large amounts of bismuth.

It will be understood that the invention is not to be limited to the details given herein but that it may be modified within the scope of the appended claims.

The embodiments of the invention in which an exclusive property or privilege is claimed are defined as follows:

1. A method for recovering polonium from irradiated bismuth comprising contacting the irradiated bismuth with molten sodium hydroxide at 400–500° C. in an inert atmosphere whereby two phases are formed, separating the molten sodium hydroxide phase from the bismuth phase, and recovering the polonium from the sodium hydroxide phase by liquid-liquid extraction.

2. A method according to claim 1 wherein said sodium hydroxide phase is separated from said bismuth phase while still molten.

3. A method according to claim 2 wherein said sodium hydroxide phase is dissolved in aqueous nitric acid and the polonium extracted therefrom with dibutylbutyl phosphonate dissolved in kerosene.

4. A method according to claim 3 wherein the irradiated bismuth is agitated with about one-tenth to four times its weight of sodium hydroxide for 30–60 minutes.

References Cited

UNITED STATES PATENTS

| | | | |
|---|---|---|---|
| 3,271,320 | 9/1966 | Moore | 176—14 |
| 2,910,345 | 10/1959 | Van Winkle et al. | 23—341 |
| 2,894,817 | 7/1959 | Karraker | 23—312 |

CARL D. QUARFORTH, Primary Examiner

MICHAEL J. McGREAL, Assistant Examiner

U.S. Cl. X.R.

23—339, 325, 312; 260—429